(No Model.) 2 Sheets—Sheet 2.

C. A. HULT.
CENTRIFUGAL CREAM SEPARATOR.

No. 473,005. Patented Apr. 19, 1892.

WITNESSES:

INVENTOR:
C. A. Hult
BY Munn & Co.
ATTORNEYS

UNITED STATES PATENT OFFICE.

CARL ALRICK HULT, OF STOCKHOLM, SWEDEN.

CENTRIFUGAL CREAM-SEPARATOR.

SPECIFICATION forming part of Letters Patent No. 473,005, dated April 19, 1892.

Application filed April 30, 1891. Serial No. 391,030. (No model.)

*To all whom it may concern:*

Be it known that I, CARL ALRICK HULT, of Stockholm, Sweden, have invented a new and useful Improvement in Centrifugal Cream-Separators, of which the following is a full, clear, and exact description.

My invention relates to an improvement in cream-separators, and has for its object to provide a machine of simple and durable construction, capable of thoroughly separating cream from milk or butter from milk; and a further object of the invention is to provide a machine in which the separators will have two movements, and wherein centrifugal force will be employed in the separation of the fluids or the solids from the fluids.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
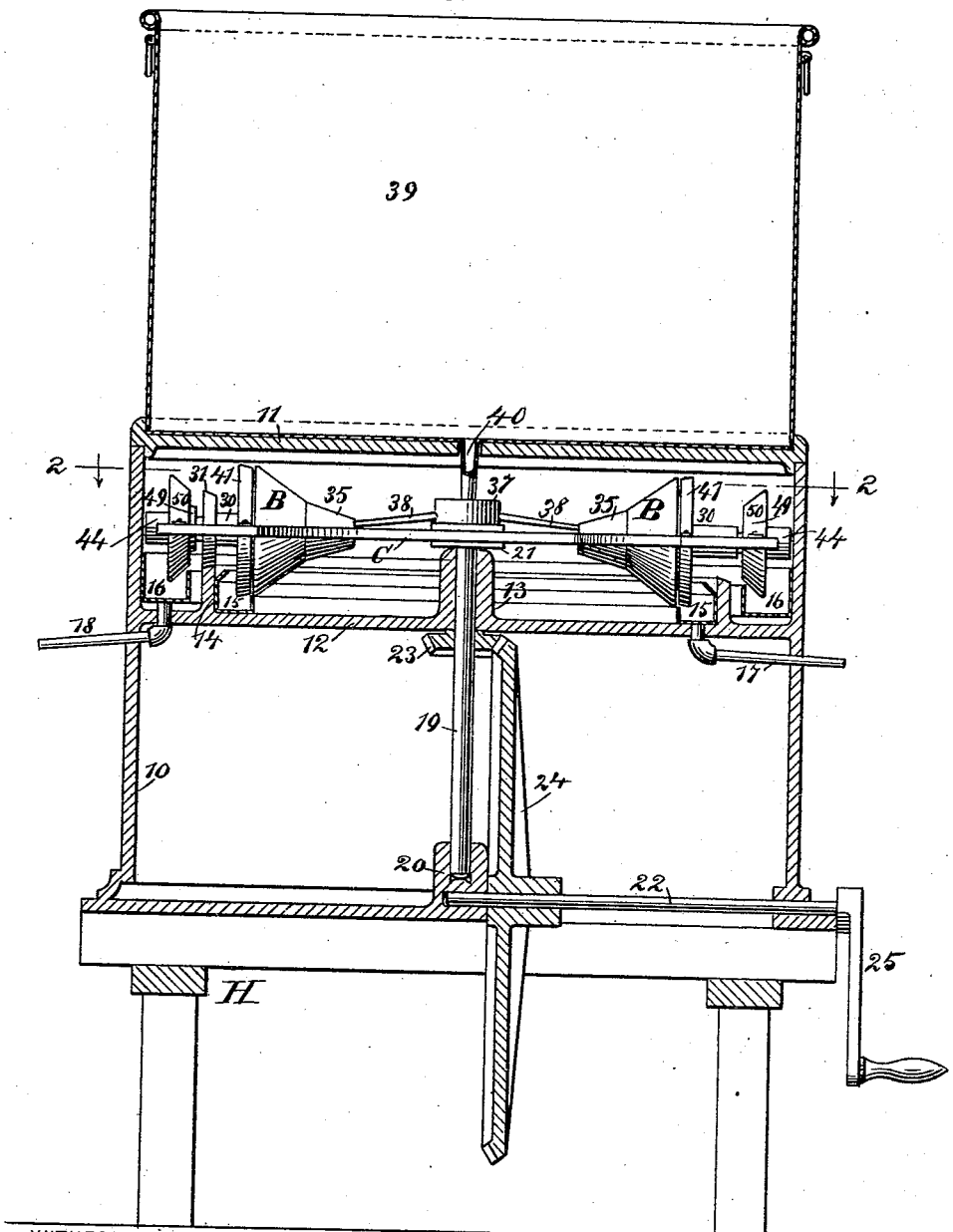
Figure 2:
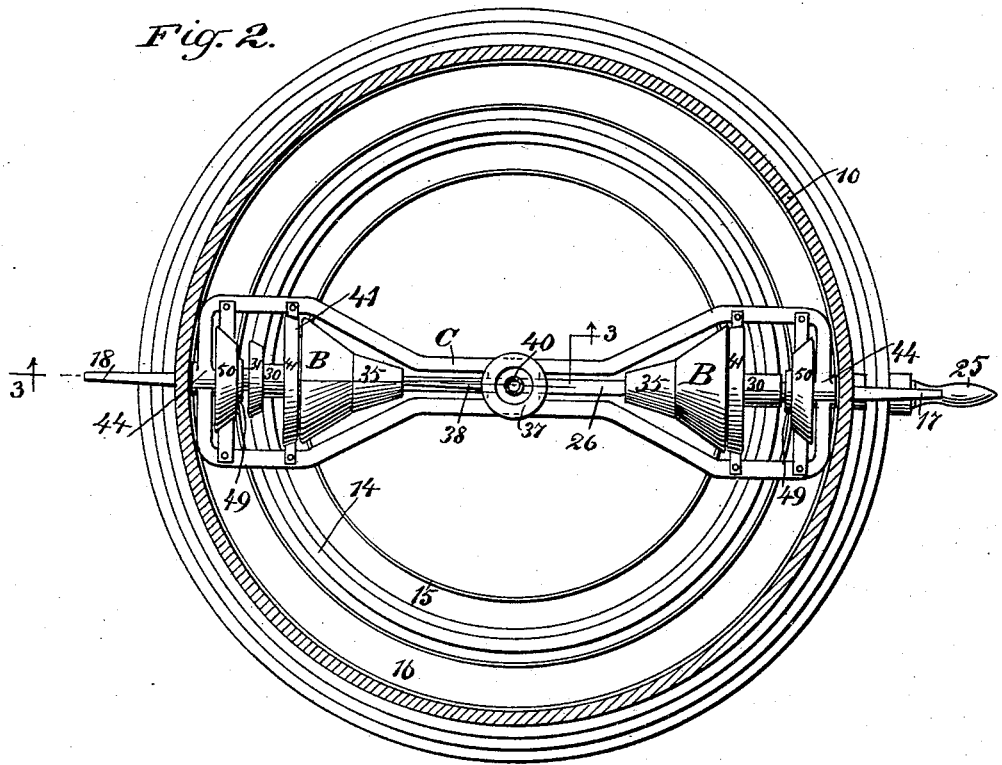
Figure 3:
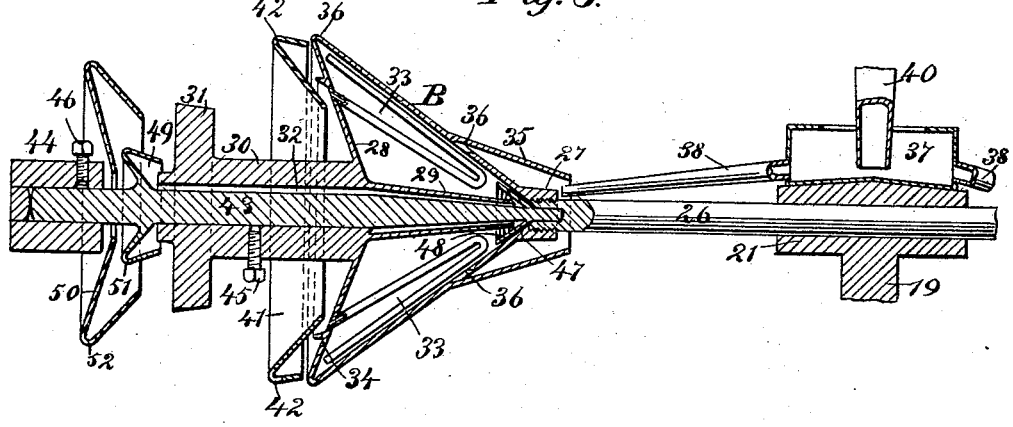

Figure 1 is a vertical section through the machine. Fig. 2 is a horizontal section taken practically on the line 2 2 of Fig. 1, and Fig. 3 is a vertical section taken practically on the line 3 3 of Fig. 2.

A casing 10, preferably cylindrical, is mounted upon any approved form of base A. The casing is provided with a flanged cover 11 and a horizontal partition 12. The partition is constructed with a central upright tubular bearing-post 13 and an annular rib 14, both being upon the upper face of the partition. Upon the inner face of the rib an annular trough 15 is secured, having one edge flanged inward, and a second trough 16 is located at the opposite side of the rib and fastened to the casing, as shown in Fig. 1. The trough 15 is provided with an outlet-pipe 17 and the trough 16 with a similar pipe 18, the pipes being carried through opposite sides of the casing.

An upright shaft 19 is journaled at its lower end in a box 20 at the bottom of the casing, and the shaft extends upward through the bearing-post 13, terminating in a head 21. A drive-shaft 22 is journaled in the casing at a right angle to the upright shaft, and the latter shaft is provided with a pinion 23, meshing with a gear-wheel 24 upon the drive-shaft. The drive-shaft is further provided with a crank 25 or a driving-pulley for the purpose of rotating it. Ordinarily, however, the crank 25 only is employed, as the machine is especially adapted as a hand-machine. A horizontal shaft 26 is journaled in the head of the perpendicular shaft, and the extremities of the horizontal shaft are exteriorly threaded and provided with sockets.

A conical agitating cup or receptacle B is attached to each end of the horizontal shaft 26, and to that end an interiorly-threaded ferrule 27 is formed at the apex of the cup and screwed upon the threaded surface of the shaft. At the base or large end of the cup a concaved or inwardly-extending bottom 28 is formed, connecting at its center with a tapering sleeve 29, which sleeve is located centrally in the cup and extends nearly to the apex or smaller end, as is best shown in Fig. 3. A hub 30 is formed integral with or connected to the bottom of the cup around the tapering sleeve 29. The outer end of the hub has formed thereon a roller or wheel 31, and the interior of the hub is provided with a longitudinal groove 32, extending from end to end and communicating with the interior of the cup-sleeve 29. The friction roller or wheel of the cup travels upon the casing-rib 14, one only being employed in the construction of the machine. Two or more essentially U or V shaped pipes 33 are located within each cup, their ends being at the base or bottom. One end of each tube or pipe is removed a short distance from the bottom of the cup, but the other end passes through the bottom within the line of a flange 34 upon said bottom, as shown in Fig. 3. The apex of the cup is surrounded by an attached inwardly-tapering hood 35, having its inner end open, and apertures 36 are formed in the cup beneath the hood.

A distributing-vessel 37 is secured upon the head of the perpendicular shaft 19, having its bottom oppositely and downwardly inclined from the center, and the vessel is provided near its bottom at opposite sides with downwardly-inclined tubes 38, which tubes extend within the hoods of the cups, as shown in Figs. 1 and 3. A receptacle 39, adapted to contain milk, is located upon the top of the casing, and the contents of the vessel or receptacle 39 are delivered to the distributing-vessel 37, through the medium of a tube 40, connecting the two, and passed through the top of the casing, as shown in Fig. 1.

The cups are located in a skeleton frame C, the said frame being wide at its ends and narrow at its center. The side members of the frame closely approach the upper horizontal shaft 26 and are secured in any suitable or approved manner to the head of a perpendicular shaft. The cups B act in the capacity of separators, and in front of the wide end of each cup a milk-distributing pan 41 is rigidly held, said pans being fastened to the frame C. The pans are essentially U-shaped in cross-section, and the hubs of the separator-cups pass through them. The pans are located directly over the inner trough 15 and deliver the milk to the trough through the medium of apertures 42 in the bottoms of the pans.

Two extension-shafts 43 are employed in connection with the horizontal shaft 26. The inner end of each extension-shaft is journaled in a socket in one end of the said horizontal shaft, and the outer ends of the extension-shafts are journaled in boxes 44, located at the ends of the frame C. Each extension-shaft is of like construction. The end of the shaft which is journaled in the main horizontal shaft 26 is tapering and passes through the sleeve 29 of a cup. The diameter of the tapering portion of the shaft is less than the diameter of the sleeve 29, whereby a space is obtained between the shaft and sleeve. Each extension-shaft is capable of revolving in the hub of a cup, or the hub may be made fast to the shaft through the medium of a set-screw 45 or the equivalent thereof. The extension-shafts may be held in rigid connection with the frame C through the medium of set-screws 46 or their equivalents passed through the end boxes 44 to an engagement with the shaft, as is best shown in Fig. 3.

Near the inner extremity of each extension-shaft a conical hood 47 is attached, which hood, when the extension-shaft is connected with the main horizontal shaft 26, is located between the inner end of the sleeve 29 and the opposed face of the cup, as is best shown in Fig. 3. Thus the conical hood 47 virtually covers the inner end of the cup-sleeve 29, and the inner face of the hood 47 is provided with a series of teeth 48, extending at a right angle from the hood in the direction of the sleeve 29. The said teeth are preferably made of such length that they impinge upon that portion of the sleeve contained within the hood.

A small separating-pan 49 is preferably formed integral with each of the extension-shafts 43, the said separating-pans being provided with conical bottoms, whereby they are virtually U or V shaped in cross-section, and the fronts of the pans are made to face the outer ends of the cup-hubs 30. The channel 32 in said hubs establishes communication between the pans 49 and the interior of the separator-cups B as the channels connect with the spaces intervening the conical inner ends of the extension-shafts and the surrounding sleeves 29. Immediately at the back of the separator-pans 49 on the extension-shafts a distributing-pan 50, of similar construction to the distributing-pan 42, is located, each pan 50 being also rigidly attached to the frame C. The pan 50 is immediately over the outer trough 16 and is adapted to deliver to the said trough the cream or the butter separated from the milk. The smaller pans 49 are provided with apertures 51 in their bottoms, and the larger pans 50 are provided with like openings 52.

In operation if cream is to be separated from the milk the milk is placed in the vessel 39 and the shaft 19 is revolved, whereby a horizontal movement is imparted to the frame C and the shaft 26. The cups are given a rotary movement around their axes through the medium of the roller 31, engaging with the rib 14. The extension-shafts 43 are connected with the hubs of the cups, so as to revolve with the latter. The milk entering the cups from the central distributer 37 is by centrifugal motion so agitated that the cream will move in the direction of the apex of the cups and the milk will pass out through the tubes 33. The milk passing from the cups through the tubes 33 enters the distributing-pans 41 at the base of the cups and is thrown violently in the pans, and the said pans being fixed the milk runs out through the apertures 42 into the trough 15, and from thence into any desired receptacle through the pipe 17. The cream passes out from the interior of the cup between the shaft-hoods 47 and the sleeves 29 and is carried by the movement of the shaft 43 through the channels 32 into the pans 49, and the said pans, being rapidly revolved, discharge the cream into the fixed pans 50, the said pans delivering it into the outer trough 16, from whence it is conducted to any desired point through the pipe 18, connected with the trough. It will be observed, as heretofore stated, that the cups are given a rotary movement around the perpendicular shaft 19, and a rotary movement independent of the shaft upon their own axis.

When butter is to be separated from milk, the extension-shafts 43 are rigidly fastened to the frame C through the medium of the set-screws 46, whereupon the shafts revolve only around the upright shaft 19, and the cups B revolve around the extension-shafts. The centrifugal motion imparted to the milk in the separators B causes the cream to separate from the milk and gather at the apex of each of the cups or separators. As the milk is given a violent rotary motion, the cream strikes against the teeth 48 of the now stationary hoods 47, whereby the fat globules in the cream are thrown in contact with one another continuously-churning the cream into butter, which, being light, passes over the edge of the sleeves 29 and thence along the channels 32 and enters the pans 49, from whence the butter is delivered to the pans 50 and then to the outer trough 16. The buttermilk, being heavier than the butter, like the skim-milk referred to, passes through the tubes 33 into the fixed pans 41 and from them to the inner trough 15.

The movement of the cups may be said to be a planetary one, rotating upon their own axes and also around a common axis. It therefore follows that the centrifugal force does not act in a radial direction only, as in a common centrifugal machine, but that the said force acts in two directions, a radial and a horizontal direction, and, the forces being nearly equal, if the liquid to be separated is milk it is evident that the heaviest portion— that is, the skim-milk—will be thrown to the base or large portion of the cups, where the centrifugal motion is most powerful, and the cream, being the lightest, necessarily gathers at the apex of the cone, which point is where the centrifugal force has the least power. The centrifugal force, acting outward from the center of the cups, is a little stronger than the force working in a radial direction.

Having thus described my invention, I claim as new and desire to secure by Letters Patent—

1. In a centrifugal separator, the combination, with a vertical drive-shaft and a horizontal shaft carried by the vertical shaft, the horizontal shaft being capable of revolving in the vertical shaft, of conical separators attached to the extremities of the horizontal shaft with their apexes projecting inward, the said conical separators having an exit at their base and an exit and inlet at their apex, and mechanism, substantially as described, for imparting a rotary movement to the separator-cups, as and for the purpose specified.

2. In a centrifugal separator, the combination, with a main shaft, a secondary shaft carried thereby and located at a right angle thereto, the secondary shaft being adapted to revolve in the main shaft, of conical separators attached to the secondary shaft, provided with discharge-pipes extending through the base and a central discharge-sleeve communicating with the apex, inlet-pipes leading into the apexes of the separators, and means, substantially as described, for rotating the separator-cups upon their own axes, as and for the purpose specified.

3. In a centrifugal separator, the combination, with a vertical shaft, a horizontal shaft located at a right angle thereto and held to revolve therein, and a distributing-vessel attached to the vertical shaft, of conical separators secured to the extremities of the horizontal shaft, a tubular connection between the distributing-vessel and the separators, pipes located in the separators and extending through the base thereof, a discharge-tube located at the center of the separators and communicating with the apex thereof, means for revolving the separators upon their own axes, substantially as described, fixed distributing-pans located at the base of the separators, receiving-pans capable of a rotary movement located opposite the discharge portion of the central tube of the separators, and fixed discharge-pans located back of the receiving-pans, as and for the purpose specified.

4. In a centrifugal separator, the combination, with a vertical shaft, a horizontal shaft located at a right angle thereto and held to revolve therein, and a distributing-vessel attached to the vertical shaft, of conical separators secured to the extremities of the horizontal shaft, a tubular connection between the distributing-vessel and the separators, pipes located in the separators and extending through the base thereof, a discharge-tube located at the center of the separators and communicating with the apexes thereof, means for revolving the separators upon their own axes, substantially as described, fixed distributing-pans located at the base of the separators, receiving-pans capable of a rotary movement located opposite the discharge portion of the central tube of the separators, fixed discharge-pans located back of the receiving-pans, troughs located beneath the fixed distributing-pans, and communication, substantially as described, between the receiving-pans and the distributing-pans and between the distributing-pans and the troughs, as and for the purpose set forth.

5. In a centrifugal separator, the combination, with a vertical shaft, a horizontal shaft carried by and held to revolve in the head of the vertical shaft, a frame attached to the head of the vertical shaft, extension-shafts journaled in the frame and in the extremities of the horizontal shaft, and a distributing-vessel located upon the head of the vertical shaft, of conical separators secured to the ends of the horizontal shaft, each provided with an inwardly-concaved bottom connected with a central conical tube extending, essentially, to the apex of the cups, and a hub provided with a channel and held to revolve around the extension-shafts, a tubular connection between the separators and the distributing-vessel, conical toothed hoods attached to the extension-shafts and surrounding the inner ends of the separator central tubes, tubes connected with the bottom of the separators and located within the same, means for revolving the separators on their axes, fixed distributing-pans located at the base of the separators, receiving-pans located upon the extension-shafts in front of the hubs of the separators, fixed distributing-pans located back of the receiving-pans, and means, substantially as described, for imparting to the vertical shaft a rotary movement upon its axis, as and for the purpose set forth.

The foregoing specification of my new and useful improvement in centrifugal cream-separators signed by me, in Stockholm, Sweden, in the presence of the below-subscribed witnesses, on the 10th day of April, 1891.

CARL ALRICK HULT.

Witnesses:
 ERIK NYLJ,
 ALBIN ASPLING.